US012686191B2

(12) United States Patent

Hundelt

(10) Patent No.: US 12,686,191 B2

(45) Date of Patent: Jul. 21, 2026

(54) SYSTEM AND METHOD FOR STABILIZING LATERAL WINGS OF PRECURED TREAD DURING CEMENTING

(71) Applicant: Continental Reifen Deutschland GmbH, Hannover (DE)

(72) Inventor: Matthew Hundelt, Rock Hill, SC (US)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/960,979

(22) Filed: Nov. 26, 2024

(65) Prior Publication Data

US 2026/0145401 A1 May 28, 2026

(51) Int. Cl.
B29D 30/56 (2006.01)
B29D 30/54 (2006.01)

(52) U.S. Cl.
CPC ........ B29D 30/56 (2013.01); B29D 2030/541 (2013.01); B29D 2030/544 (2013.01)

(58) Field of Classification Search
CPC .. B29D 30/54; B29D 30/56; B29D 2030/541; B29D 2030/544
USPC .......................................................... 156/96
See application file for complete search history.

(56) References Cited

U.S. PATENT DOCUMENTS

| | | | | |
|---|---|---|---|---|
| 3,467,063 A | * | 9/1969 | Brinkley | B29D 30/52 |
| | | | | 118/314 |
| 4,258,083 A | * | 3/1981 | Allen | B05B 13/02 |
| | | | | 427/209 |

| | | | | |
|---|---|---|---|---|
| 4,497,927 A | * | 2/1985 | Tai | C09J 121/00 |
| | | | | 524/475 |
| 2005/0194077 A1 | | 9/2005 | Yap | |
| 2014/0261973 A1 | * | 9/2014 | Bender | B29D 30/54 |
| | | | | 156/96 |

(Continued)

FOREIGN PATENT DOCUMENTS

| | | | |
|---|---|---|---|
| DE | 102018205643 A1 * | 10/2019 | B29D 30/44 |
| JP | S52105984 A | 9/1977 | |
| JP | H04153029 A * | 5/1992 | |

(Continued)

OTHER PUBLICATIONS

Irie Kohei, JP-2013237231-A, machine translation. (Year: 2013).*

(Continued)

*Primary Examiner* — Sedef E Paquette

(74) *Attorney, Agent, or Firm* — Richard A. Wolf; Gregory Adams

(57) ABSTRACT

A method and system for preparing a precured tread includes providing an elongated strip of precured tread having a major portion including a tread surface and at least part of an underside surface opposite the tread surface, and having a lateral wing projecting from each lateral side of the major portion of the precured tread. Each lateral wing has a thickness that is less than a thickness of the major portion of the precured tread such that, when the tread surface is supported on and facing a support surface, at least a portion of each lateral wing is elevated with respect to the support surface. A polymer cement is applied to the underside surface of the precured tread with an applicator while each lateral wing is stabilized with a respective stabilizer at least at the portion of the lateral wing that is elevated with respect to the support surface.

12 Claims, 2 Drawing Sheets

(56) References Cited

U.S. PATENT DOCUMENTS

2015/0115497 A1 *  4/2015  Colby ............... B29D 30/0016
                                                        264/162
2016/0101582 A1    4/2016  Ikonomov et al.

FOREIGN PATENT DOCUMENTS

JP         2013237231 A  * 11/2013  ............. B29D 30/52
WO     WO-2018203908 A1 * 11/2018  ......... B29D 30/0016
WO     WO-2019022704 A1 *  1/2019  ............. B29D 30/56

OTHER PUBLICATIONS

Kwee Renate, DE-102018205643-A1, machine translation. (Year: 2018).*
Kozo Yamamoto, JP H04153029 A, machine translation. (Year: 1992).*
EP Search Report May 22, 2026 of European application No. 25213548.8 which is based on this application.

* cited by examiner

SYSTEM AND METHOD FOR STABILIZING LATERAL WINGS OF PRECURED TREAD DURING CEMENTING

TECHNICAL FIELD

The present disclosure relates generally to tires, and more particularly to retread tires, and even more particularly to a system and method for stabilizing lateral wings of a precured tread during a cementing process.

BACKGROUND

The tire retreading process involves replacing a worn tread with a new tread while reusing the remainder of the tire casing for cost-effectiveness and environmental friendliness. The conventional steps of a common retread process using precured tread includes: removal of the worn tread through a buffing process, repair of any damage to the tire casing, bonding of the precured tread to the casing using a layer of cushion gum, and curing the cushion gum with heat and pressure to ensure the new tread is securely bonded to the tire casing.

SUMMARY

The precured tread used in conventional retread applications is commonly provided in strip-form for adhering to the cushion gum on the tire casing during the retread process. To enhance the tack of the precured tread with the cushion gum, a rubber cement may be applied to the underside of the precured tread strip. In this process, the underside of the precured tread strip may first be buffed for surface preparation and then the rubber cement is applied to the underside of the precured tread such as via a rolling process. The rubber cement typically contains solvents and other volatiles which are removed via a drying step. The rubber cement is still tacky at this stage, and so to prevent the precured tread from sticking to itself when wound into a roll, a polymer film is applied over the cement after drying. The precured tread with cement and polymer film is then wound into a roll and is ready to be used in the retreading process, whereby the film is removed and the tacky cement is contacted with the cushion gum during retread.

Some precured treads include lateral extensions or "wings," that partially form the shoulder region of the retreaded tire. These lateral wings serve to create a seamless transition between the tread and the casing, distributing stresses evenly across the tread and shoulder area. This may help to reduce the risk of premature wear or delamination, and may enhance driving performance such as by improving cornering stability or the like. Additionally, the lateral wings may enhance bond strength with the cushion gum by providing an increased surface area for adhesion at the shoulder, a region subjected to significant mechanical stresses such as flexing and shearing. By forming a portion of the shoulder, the lateral wings also offer added protection to the casing against damage from curbs, debris, or rough terrain. As such, the lateral wings help to further ensure the retreaded tire more closely mimics the functional characteristics of a new tire.

At least one problem with such precured tread having lateral wings is that these wings conventionally are relatively flexible and are not stabilized during preparation of the precured tread, such as during the process of applying the polymer cement to the underside surface of the precured tread. Such a process generally applies the polymer cement with force distributed to the precured tread, such as a compressive and/or shear force distributed by a roller, which can cause the lateral wings to elastically deform, whereby the cement is then applied unevenly to the region of the wings. This uneven application of the rubber cement to the wings may include smearing of the cement, excessive cement, insufficient cement, or the like, which may result in further issues during the application of the film layer to protect the cement and/or during the retread process.

At least one aspect of the present disclosure solves one or more problems associated with conventional process steps of preparing a precured tread by providing stabilizers that stabilize the lateral wings of the precured tread during at least the cementing process.

According to an aspect, a method of preparing a precured tread includes: providing an elongated strip of precured tread having a major portion including a tread surface and at least part of an underside surface opposite the tread surface, and having a lateral wing projecting from each lateral side of the major portion of the precured tread, each lateral wing having a thickness that is less than a thickness of the major portion of the precured tread such that, when the tread surface is supported on and facing a support surface, at least a portion of each lateral wing is elevated with respect to the support surface; applying a polymer cement to the underside surface of the precured tread with an applicator; wherein during the applying of the polymer cement, each lateral wing is stabilized with a respective stabilizer at least at the portion of the lateral wing that is elevated with respect to the support surface.

According to an aspect, a system for preparing a precured tread includes: a source of precured tread provided as an elongated strip having a major portion including a tread surface and at least part of an underside surface opposite the tread surface, and having a lateral wing projecting from each lateral side of the major portion of the precured tread, each lateral wing having a thickness that is less than a thickness of the major portion of the precured tread such that, when the tread surface is supported on and facing a support surface, at least a portion of each lateral wing is elevated with respect to the support surface; an applicator downstream of the source of precured tread, the applicator including a source of a polymer cement and being configured to apply the polymer cement to the underside surface of the precured tread; and a respective stabilizer mounted on each lateral side of the precured tread below the applicator, the respective stabilizers each having a support with a bearing surface that is configured to engage an interface surface of the respective lateral wings at least at the portion of the respective lateral wing that is elevated with respect to the support surface, thereby stabilizing the respective wings when the applicator applies the rubber cement to the underside surface of the precured tread.

The following description and the annexed drawings set forth certain illustrative embodiments according to the present disclosure. These embodiments are indicative, however, of but a few of the various ways in which the principles of the invention may be employed. Other objects, advantages and novel features according to aspects of the present disclosure will become apparent from the following detailed description when considered in conjunction with the drawings.

BRIEF DESCRIPTION OF THE DRAWINGS

The annexed drawings, which are not necessarily to scale, show various embodiments according to the present disclosure.

DETAILED DESCRIPTION

The principles and aspects according to the present disclosure have particular application to precured treads, and thus will be described herein mainly in this context. It is understood, however, that the principles and aspects of the present disclosure may be applicable to other types of treads or other types of tires for other applications, or to other elastomeric articles in general, when desirable to provide one or more advantages of the construction(s) described herein.

Figures 1, 2:
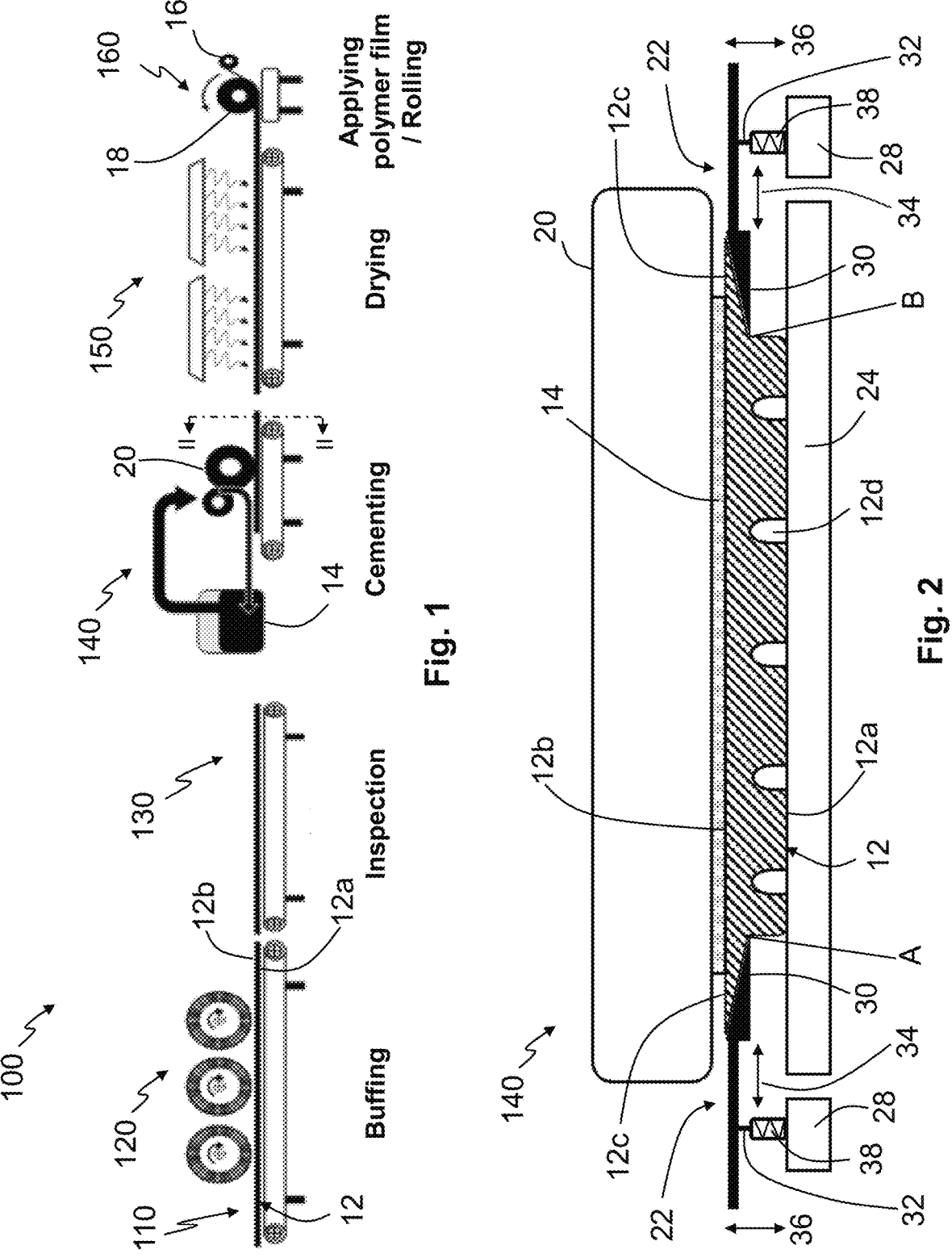
FIG. 1 is a schematic side view depicting an exemplary process of applying a polymer cement to a precured tread while stabilizing lateral wings of the precured tread according to an embodiment of the present disclosure.
FIG. 2 is a schematic cross-sectional front view taken about the line II-II in FIG. 1, showing the precured tread's lateral wings stabilized via stabilizers as the rubber cement is applied via a roller in accordance with an exemplary embodiment of the present disclosure.

FIG. 1 is a schematic side view of an exemplary process 100 for preparing a precured tread 12 having lateral wings. The process 100 generally may include the steps of (i) providing 110 the precured tread 12; (ii) buffing 120 the underside surface 12b of the precured tread 12; (iii) inspecting 130 the precured tread 12 after buffing 120; (iv) applying 140 a rubber cement 14 to the underside surface 12b of the precured tread 12 while stabilizing the lateral wings 12c; (v) drying 150 the polymer cement 14 with heat and/or air circulation; and (vi) applying 160 a top film layer 16 to cover the cement 14, whereby the precured tread 12 along with cement 14 and film 16 can be wound into a roll 18. FIG. 2 illustrates a front side view of the process 140 of applying the polymer cement 14 to the underside surface 12b of the precured tread 12 with an applicator 20 while stabilizing the lateral wings 12c of the precured tread 12 with stabilizers 22 as the tread 12 is being conveyed by a conveyor 24. These exemplary process steps of the method 100 will be described in further detail below.

The precured tread 12 generally is provided 110 in an elongated strip-form with a tread surface 12a and underside surface 12b opposite the tread surface 12a. The underside surface 12b is the surface that faces a retread tire casing 64 and is bonded to the tire casing with a bonding layer commonly referred to as cushion gum 62, as shown with exemplary reference to portion of retread tire 60 in FIG. 3.

Figure 3:
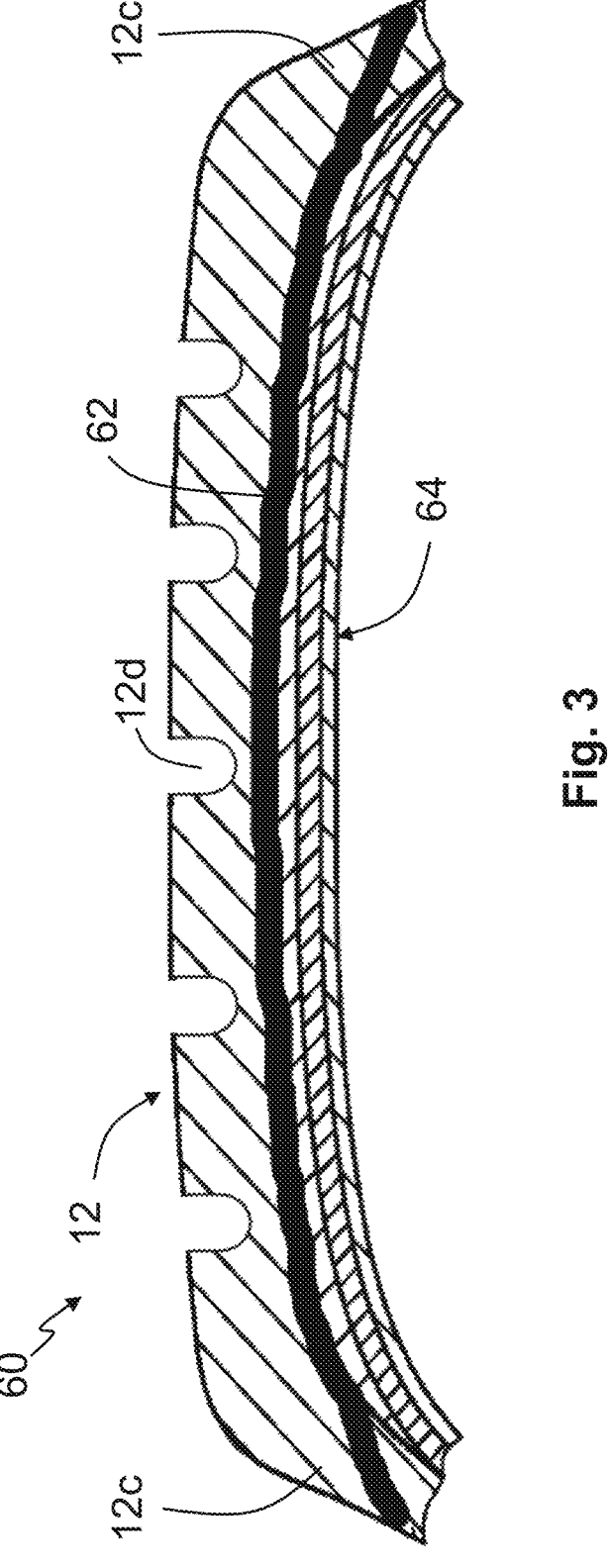
FIG. 3 is a cross-sectional view illustrating an exemplary retread tire using the preformed tread in FIG. 2 applied to a tire casing.

The strip of precured tread 12 may have any suitable configuration and may be formed from any suitable rubber mixture as desired for the particular retread application. Generally, the precured tread 12 is formed from a rubber mixture that is cured (vulcanized) to form the tread surface 12a and the underside surface 12b opposite the tread surface. The tread surface 12a generally may include longitudinal grooves 12d along a length the strip which form circumferential grooves 12d when applied to the tire casing 64 during the retread (FIG. 3). Such tread pattern also can include transverse grooves forming profile blocks; sipes; or any other suitable tire tread feature. The length of the elongated precured tread strip 12 generally is sufficiently long to continuously wrap around the circumference of the tire casing being retread.

The precured tread 12 includes lateral extensions 12c, also referred to as lateral wings 12c, that at least partially form the shoulder region of the retreaded tire 60 (see e.g., FIG. 3). These lateral wings 12c generally serve to create a seamless transition between the tread 12 and casing 64, distributing stresses evenly across the tread and shoulder area. This may help to reduce the risk of premature wear or delamination, and may enhance driving performance such as by improving cornering stability or the like. Additionally, the lateral wings 12c may enhance bond strength with the cushion gum 62 by providing an increased surface area for adhesion at the shoulder, a region subjected to significant mechanical stresses such as flexing and shearing. By forming a portion of the shoulder, the lateral wings 12c also offer added protection to the casing 64 against damage from curbs, debris, or rough terrain. As such, the lateral wings 12c help to further ensure the retreaded tire 60 more closely mimics the functional characteristics of a new tire.

The major portion of the elongated strip of precured tread 12 includes the tread portion with tread surface 12a and at least part of the opposite underside surface 12b, as shown between points A and B in the illustrated embodiment of FIG. 2. The lateral wings 12c project from each lateral side of the major portion of the precured tread 12. The lateral wings 12c may be integral and unitary with the major portion of the precured tread 12 as these parts may be molded and cured together when forming the precured tread 12. As shown in the illustration of FIG. 2, the lateral wings 12c may have respective portions of the underside surface 12b which may be buffed via process 120 and/or which may have cement 14 applied thereto via cementing process 140. The lateral wings 12c have a thickness that is less than a thickness of the major portion of the precured tread 12, which when combined with the elastomeric nature of the rubber compound enables these wings 12c to be suitably formed into the shoulder region of the retread tire 60. This thickness as measured for the lateral wings 12c may be at position of the wing that is below the tread surface 12a when the tread surface is facing upright. In the illustrated embodiment, for example, the thickness may be a maximum thickness of the lateral wings 12c at the point where they connect to the major portion of the precured tread 12, which is at points A and B in the illustration. For example, the lateral wings 12c may have a thickness from about 1.0 mm to about 3.5 mm (as measured vertically from the connection points A and B), more particularly the maximum thickness of the wings 12c may be from about 2.0 mm to about 3.0 mm. The wings 12c may have a continuous taper toward their lateral extent, which the thickness at the tip of the wings 12c may be in a range from about 0.5 mm to about 1.0 mm, for example. The thickness of the major portion of the precured tread may be a maximum thickness as measured between the tread surface 12a and underside surface 12b.

As noted above, the exemplary process 100 may include a buffing process 120 in which the underside surface 12b of the precured tread 12 is buffed prior to applying 140 the polymer cement 14. The buffing process 120 prepares the underside surface 12b of the precured tread for retreading by providing a suitable surface texture and/or evenness. The buffing 120 generally includes removal of material from the underside surface 12b via suitable buffers, such as wire brushes or the like. Accordingly, after such buffing 120, the rubber cement 14 is applied to the buffed underside surface 12b of the precured tread. Alternatively, the process 100 may not have a buffing step 120 as the precured tread 12 could be delivered to a retread facility in an already prepared form, for example with the underside surface 12b of the precured tread already buffed.

After buffing 120, the underside surface 12*b* of the precured tread may be inspected at step 130. The inspecting 130 may include evaluating the surface has proper surface roughness, cleanliness, evenness, lack of defects, or the like.

The cementing step 140 applies the rubber cement 14 to the underside surface 12*b* of the precured tread 12. The rubber cement 14 may be applied in any suitable form to cover only a portion or an entirety of the underside surface; for example being applied in an array of strips, dots, or the like. Generally, the underside surface 12*b* as prepared (e.g., buffed) may be cleaned via vacuums, solutions, or the like, and no further materials remain on the underside surface 12*b* of the precured tread 12. As such, the polymer cement 14 may directly contact the rubber at the underside surface 12*b* of the precured tread 12. It is understood, however, that such process 100 could be adapted to include intermediate steps, such as adding materials like suitable coupling agents or other material layers to the underside surface 12*b* to interact with the polymer cement 14 and aid in coupling the polymer cement to the underside surface 12*b*. Accordingly, it understood that such terms like contacting, applying, or the like may include direct engagement or indirect engagement unless expressly noted otherwise to the contrary. Accordingly, "applying the polymer cement with the underside surface of the precured tread" is understood to be satisfied even when an intermediate material or layer is interposed between the rubber of the precured tread and the polymer cement.

This polymer cement 14 is used to enhance the tack of the precured tread 12 with the cushion gum 62 during the retread process and may have any suitable composition and/or structure to achieve this function without negatively affecting the bonding performance of cushion gum 62 when cured. The term polymer cement means that the cement includes at least one polymer that forms the binder/matrix of the cement (when dried) and which may include further additional additives as understood by those skilled in the art. This may include, for example, from about 25 wt. % to about 80 wt. % based on total weight of the polymer cement when dried, more particularly from about 40 wt. % to about 60 wt. % when dried. Generally, the polymer matrix is in an uncrosslinked state when the cement 14 is applied 140 and is thereafter cured during the curing of the cushion gum 62 when bonding the precured tread 12 to the tire casing 64.

The polymer(s) used for the matrix of the polymer cement 14 may include elastomer(s) or rubber(s) to form a rubber mixture along with additives to form the cement 14. The polymer matrix of the rubber mixture generally will be formed from a majority of rubber/elastomer material(s) as opposed to other types of non-elastomer base polymer(s) to provide elastic properties, for example at least 80 wt. %, or at least 90 wt. % or more rubber/elastomer material(s) forming the polymer matrix of the rubber mixture. Suitable rubbers may include, but is not limited to, natural rubber (NR), epoxidized natural rubber (ENR), polybutadiene rubber (BR), acrylonitrile butadiene rubber (NBR), carboxylated nitrile rubber (XNBR), (partially) hydrogenated nitrile rubber (HNBR), styrene butadiene rubber (SBR), carboxylated styrene-butadiene rubber (XSBR), styrene/ethylene-butylene/styrene-based (SEBS), ethylene propylene monomer (EPM), ethylene propylene diene monomer (EPDM), chloroprene rubber (CR), isoprene rubber (IR), butyl rubber (IIR), bromobutyl rubber (BIIR), chlorobutyl rubber (CIIR), chlorinated polyethylene (CPE), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorine rubber (FKM), fluorinated methylsilicone rubber (MFQ), perfluorinated propylene rubber (FFPM), perfluorocarbon rubber (FFKM), and/or the like, or blends thereof.

The additives in the composition are compounded relative to the total base polymer content of the composition, and as such may be represented in parts per hundred (phr), which means parts by weight per 100 parts by weight of the base/matrix polymer(s). Such additives may include, and are not limited to, vulcanizing agents (e.g., sulfur or peroxides), accelerators, retardants to prevent an unduly quick cure, activators, antidegradants, tackifiers, processing aids, reinforcing agents (such as carbon black or silica), other mineral fillers, or the like. To help prevent contamination with the cushion gum 62, the polymer cement 14 may be essentially free of silicone, such as less than 1 wt. % silicone or about 0.1 wt. % silicone or less.

In exemplary embodiments, to provide sufficient tackiness of the rubber cement, the polymer cement may include one or more tackifiers which may be present in an amount from about 0 phr to 25 phr, more particularly from about 5 phr to about 25 phr as an example. Such tackifier(s) may include hydrocarbon resins, such as C5 (e.g., aliphatic) resins, C9 (e.g., aromatic) resins, and C5/C9 hybrids, which are derived from petroleum feedstocks; terpene resins, derived from natural sources like pine trees; phenolic resins, such as resorcinol-formaldehyde resins; rosin and rosin esters, which are natural resins; or the like. Other tackifiers may include polymeric types, such as polyisobutylene resin, as well as liquid or semi-solid tackifiers designed for specific processing requirements. The selection of a tackifier is influenced by factors such as compatibility with the rubber type, processing needs, and the end-use application to provide suitable adhesion. It is understood, however, that depending on the type of polymer (e.g., rubber) used for the polymer cement, the cement may have sufficient tackiness without the addition of these added tackifiers.

In exemplary embodiments, the polymer cement 14 is a rubber mixture that has the same composition as the cushion gum 62 except with the optional addition of one more tackifiers. This enables the polymer cement 14 to not act as a contaminant in the retread bonding process. In embodiments, the one or more additional tackifiers include aliphatic C5 resin(s). In embodiments, the one or more additional tackifier(s) are added into the cushion gum rubber mixture in an amount from 0 phr to 25 phr, more particularly from about 5 phr to about 25 phr, to form the polymer cement.

To facilitate the application process 140 of the polymer cement 14 to the underside surface 12*b* of the precured tread 12, the polymer cement 14 may be solvated with a suitable solvent to make the polymer cement 14 flowable. As an example, the application process 140 may include using an applicator 20, including equipment such as a roller (also 20), spreader, stamper, sprayer, and/or the like, which transfers the flowable polymer cement 14 to the underside surface 12*b* of the precured tread 12. To provide suitable flowability during the application process 140, such as via rolling, the polymer cement 14 as applied may have a relatively low solids content of about 30 wt. % or less, such as in a range from about 15 wt. % to 30 wt. %, more particularly from about 20 wt. % to 25 wt. %, for example. The liquids content of the polymer cement, which may be the balance, may be entirely solvent. Any suitable solvent may be used, such as an organic hydrocarbon based solvent. As an example, the polymer cement 14 may include about 70 wt. % to 85 wt. % of heptane, which is a nonpolar solvent that that is particularly useful with nonpolar rubbers. The solvent can be evaporated relatively quickly via the (heated and/or air circulation) drying process 150.

As noted above, at least part of the lateral wings 12c have a thickness (e.g., as measured at points A and B, or outward therefrom) that is less than a thickness of the major portion of the precured tread (e.g., as measured at a maximum thickness between points A and B), which facilitates bending of the wings 12c into the shoulder region of the retread tire. Because of this relative thinness of at least part of lateral wings 12c, when the tread surface 12a is supported on and facing a support surface (such as conveyor surface 24), at least a portion of each lateral wing 12c is elevated with respect to the support surface 24 (e.g., the portion of wings 12c outward from points A and B, which is the entire lateral wing 12c in the illustrated embodiment). In a conventional cementing process, in which the relatively flexible wings 12c are at their elevated position and are not stabilized during preparation of the precured tread 12 (e.g. during cementing 140), these wings 12c can elastically deform in response to forces imparted by the applicator (e.g., roller 20). This deformation can cause inconsistencies in the preparation at the region of the wings 12c, for example by causing the cement 14 to be applied unevenly to the region of the wings 12c. This uneven application of the rubber cement 14 to the lateral wings 12c may include smearing of the cement 14, excessive cement, insufficient cement, or the like, which may result in further issues during the application of the film layer 16 to protect the cement and/or during the retread process.

To solve at least these deficiencies of the conventional cementing process, the exemplary process 100 including the cementing step 140 uses stabilizers 22 that stabilize the lateral wings 12c during application of the polymer cement 14 to the underside surface 12b of the precured tread 12. More particularly, the stabilizers 22 stabilize at least some portions of the respective wings 12c that are elevated with respect to the support surface (e.g., conveyor 24). This could include all portions of the wing 12c that are elevated, or only some portions of the wing 12c that are elevated, such as a majority of the elevated portion of the wings 12c. These stabilizers 22 provide such stability control by counteracting the forces imparted against wings 12c by the applicator 20. For example, the applicator 20 in the form of roller 20 may impart compressive and shear forces against the wings 12c and other portions of the precured tread 12 during the application of the rubber cement 14 to the underside surface 12b. By counteracting these force(s), the stabilizers 22 restrict elastic deformation of the wings 12c and/or provide proper spacing relative to the applicator (e.g., roller 20) for more consistent application of the cement 14.

In exemplary embodiments, each stabilizer 22 may include one or more of at least one support 30 for supporting the respective wing 12c, at least one adjuster 32 for modulating the horizontal 34 and/or vertical 36 and/or angular positioning of the support 30 based on the positioning of the wing 12c, and at least one force generator 38 configured to provide stabilization force(s) that counteract the force(s) from the applicator 20.

The at least one support 30 serves as the structural element upon which the wings 12c are supported and which can transmit the counterforce from the applicator 20 and/or the force generator 38 to the wings 12c. The support 30 includes a bearing surface that engages against an interface surface of the wing 12c. One or more such bearings surfaces may be provided. As shown, this bearing surface may be constructed as a complimentary shape to the interface surface of the wing 12c to increase the surface area that is supported. For example, the interface surface of the wings 12c may have a tapered surface, and the bearing surface of the support 30 may have a complimentary tapered surface. The tapered interface provided by the bearing surface of the support 30 also can help to split force vectors of the counterforce from the applicator 20 and/or the force generator 38 (when used). The splitting of force vectors can help improve stabilization of the wings 12c both vertically and horizontally. It also could help simplify the force generator 38 to generate only a vertical force or a horizontal force which is split into the respective force vectors to stabilize the wing 12c.

The support 30 may be constructed from durable materials such as metals like aluminum or steel, or high-strength polymers such as polycarbonate or PEEK. The support may be rigid or incorporate flexible elements to accommodate dynamic load adjustments. The bearing surface of the support 30 may be constructed of a different material than other portions of the support to reduce friction and/or wear with the rubber of the wing 12c. For example, the bearing surface of the support 30 may be made from polytetrafluorethylene (PTFE), Ultra-High Molecular Weight Polyethylene (UHMWPE), Acetal (Polyoxymethylene or POM), Polyetheretherketone (PEEK), Nylon (Polyamide), Polycarbonate (PC) with lubricants, or the like. The bearing surface may be part of replaceable part of the support 30 for replacement in the case of wear.

The at least one adjuster 32 is operatively connected to the support 30 and enables fine-tuned adjustments of the support position in horizontal 34, vertical 36, and/or angular dimensions. This is particularly beneficial for enabling adjustments for different precured tread constructions which may have different widths and/or wing constructions. Each directional adjustment may have a specific adjustor 32 or one or more of the adjuster(s) 32 can provide a plurality of directional adjustments. Different configurations of adjusters 32 may be utilized to achieve this functionality. Mechanical adjusters, for example, may include threaded rods, screws, or cams, which can be manually rotated or actuated to adjust the position. These adjusters 32 may further include locking mechanisms, such as spring-loaded pins, to secure the desired position. Electromechanical adjusters may employ stepper motors or servo motors to precisely control the position of the support 30, which may be integrated with sensors such as potentiometers or encoders to enable closed-loop control. Additionally, hydraulic or pneumatic adjusters can use fluid power systems like pistons or bladders to modulate positioning, with valves incorporated for fine-grained adjustments. Elastic adjusters, which include flexible components like springs or elastomeric elements, allow responsive adjustments under variable loads.

The at least one force generator 38 applies stabilization force(s) to counteract the force(s) imparted on the wings 12c by the applicator 20. The force generator(s) may generate a force in the horizontal 34 and/or vertical 36 and/or angular direction. Each directional force may have a specific force generator 38 or one or more of the force generator(s) 38 can provide a plurality of directional adjustments. Various types of force generators 38 can be employed to achieve this functionality depending on the application or as may be desired. For example, the force generators 38 may include biasers, which may include passive components such as springs, elastic bands, or counterweights that exert a continuous force to counterbalance external loads or maintain a desired position. Alternatively or additionally, the force generators 38 may include actuators, which may provide active stabilization by generating forces dynamically in response to external inputs. Electromagnetic actuators, such as solenoids or linear motors, exert controlled forces through varying electrical input, while hydraulic or pneumatic actuators utilize pressurized fluid to generate precise linear or rotary motion. Piezoelectric actuators leverage piezoelectric materials to provide high-frequency, small-displacement force application, and pneumatic actuators employ compressed air to achieve rapid adjustments or force generation. The force generator 38 may also include a feedback control mechanism, utilizing sensors such as accelerometers, gyroscopes, or strain gauges to modulate the applied force in real-time. This feedback system can communicate with an electronic controller, such as a central control unit, to execute adaptive stabilization strategies.

The stabilizers 22 may be mounted at any suitable location for providing the stabilization of the wings 12c. For example, the stabilizers 22 may be mounted in fixed position relative to the conveyor 24, such being mounted to a frame 28 of the cementing machine. In some embodiments, the stabilizer 22 could be mounted to the conveyor 24 for movement together. However, fixed mounting of the stabilizers 22, such as to the frame 28, may be a more simplified and preferred approach. In such a fixed construction, the stabilizers 22 may be located below the roller, and may span upstream and/or downstream of the roller. The precured tread 12 could be guided onto these stabilizers 22, such as via suitable guides.

Referring back to FIG. 1, the process 100 includes drying step 150 to remove the solvents or other volatiles from the rubber cement 14. This may include the use of heaters and/or air circulation, and also may demand additional solvent extraction and recovery equipment.

Because the rubber cement 14 is still tacky after the drying step 150, the polymer film 16 is applied over the rubber cement 14 so to prevent the precured tread 12 from sticking to itself when wound into roll 18. In exemplary embodiments, the top film layer 16 is a polymer sheet which may be made from any suitable polymer, such as flexible polymers. For example, the polymer sheet 16 may be low-density polyethylene (LDPE) (e.g., 0.91-0.94 g/cc), high-density polyethylene (HDPE) (e.g., 0.95-0.97 g/cc), polypropylene (PP), ethylene vinyl acetate (EVA), or the like. The polymer film 16 may have a thickness that provides suitable flexibility. For example, the flexible polymer film may have a thickness in a range from about 0.05 mm to 0.3 mm, more particularly from about 0.1 mm to about 0.2 mm. The polymer cement 14 may have a thickness from about 0.5 mm to about 3 mm, more particularly from about 1 mm to 2 mm, for example.

This roll 18 of precured tread 12 with cement 14 and polymer film 16 is then ready to be used in the retreading process, whereby the film 16 is removed and the tacky cement 14 is contacted with the cushion gum 62 during retread.

FIG. 3 illustrates a portion of retread tire 60 using the prepared precured tread 12 in accordance with the method 100 and as illustrated in FIGS. 1 and 2. As is conventional, the tire casing 64 may include carcass ply or plies, which may be made of fabric or steel cords embedded in rubber. Beneath the previously removed tread, the casing 64 may include belts which remain in place, reinforcing the casing and enhancing its resistance to deformation and punctures. The sidewalls are intact along the lateral portions of the casing 64, connecting the structural components and providing support to the outer edges. The beads (not shown), located at the inner circumferential edges of the casing 64, ensure secure engagement with the wheel rim and maintain the seal for air retention. The inner liner, positioned on the innermost surface of the casing 64, acts as a barrier to contain air pressure. The shoulder regions, which form the transition between the sidewalls and the tread area/crown, also may be buffed. In this manner, when the worn/old tread is removed from the tire casing, the area of the tread crown, as well as the shoulder regions (part of the buffing profile), are roughened during the buffing process to create a texture that increases surface area and allows the cushion gum 62 to flow into these crevices and increase bonding. This casing structure 64 forms the basis for adhering the cushion gum 62 and precured tread 12 in the tire retreading process. The polymer cement 14 of the precured tread 12 may intermix with the cushion gum 62 and thus is shown as such in the illustrated embodiment.

Such a retread process, therefore, may include the steps; (i) providing a buffed tire casing 64 or buffing the worn tread from a tire to provide the tire casing 64; (ii) applying a cushion gum 62 around the circumference of the buffed tire casing 64; (iii) providing the precured tread 12 with cement 14 and film 16 manufactured according to the method 100; (iv) removing the top film layer 16 from the precured tread 12 while retaining the tacky polymer cement 14 on the underside surface 12b of the precured tread 12; (v) applying the precured tread 12 to the tire casing 64 by contacting the tacky polymer cement 14 with the cushion gum 62, whereby the cushion gum 62 and polymer cement 14 may intermix; and (vi) bonding the precured tread 12 to the tire casing 64 by curing the cushion gum 62 using heat and/or pressure.

Exemplary method(s) and system(s) for preparing a precured tread by stabilizing wings of the precured tread with respective stabilizers have been described herein. It is understood that although shown and described with respect to the polymer cement application process 140, the system and method may be applicable to other parts of the system in which a force is imparted to the lateral wings 12c that could elastically deform the wings causing issues. For example, the stabilizers 22 also could be added to the buffer at process 120 to stabilize the wings 12c during buffing. Such features would be substantially similar to the features and structures shown and described with respect to FIG. 2, except replacing applicator 20 with buffer(s) (e.g., buffing wheel) and showing these buffers contacting the underside surface 12b instead of having the cement 14.

According to an aspect, a method of preparing a precured tread includes: providing an elongated strip of precured tread having a major portion including a tread surface and at least part of an underside surface opposite the tread surface, and having a lateral wing projecting from each lateral side of the major portion of the precured tread, each lateral wing having a thickness that is less than a thickness of the major portion of the precured tread such that, when the tread surface is supported on and facing a support surface, at least a portion of each lateral wing is elevated with respect to the support surface; applying a polymer cement to the underside surface of the precured tread with an applicator; wherein during the applying of the polymer cement, each lateral wing is stabilized with a respective stabilizer at least at the portion of the lateral wing that is elevated with respect to the support surface.

According to an aspect, a system for preparing a precured tread includes: a source of precured tread provided as an elongated strip having a major portion including a tread surface and at least part of an underside surface opposite the tread surface, and having a lateral wing projecting from each lateral side of the major portion of the precured tread, each lateral wing having a thickness that is less than a thickness of the major portion of the precured tread such that, when the tread surface is supported on and facing a support surface, at least a portion of each lateral wing is elevated with respect to the support surface; an applicator downstream of the source of precured tread, the applicator including a source of a polymer cement and being configured to apply the polymer cement to the underside surface of the precured tread; and a respective stabilizer mounted on each lateral side of the precured tread below the applicator, the respective stabilizers each having a support with a bearing surface that is configured to engage an interface surface of the respective lateral wings at least at the portion of the respective lateral wing that is elevated with respect to the support surface, thereby stabilizing the respective wings when the applicator applies the rubber cement to the underside surface of the precured tread.

Exemplary embodiment(s) may combine one or more features of the foregoing aspects with each other in any suitable manner; and/or exemplary embodiment(s) may include one or more of the following additional features combined with any of the foregoing or following aspects, in which one or more of these additional features may be combined separately or in any suitable combination with each other.

In exemplary embodiment(s), the method and/or system includes that the precured tread is conveyed to the applicator with a conveyor, in which the tread surface is supported on and faces the conveyor so that at least the portion of each lateral wing is elevated with respect to the conveyor.

In exemplary embodiment(s), the method and/or system includes that the applicator includes a roller; and wherein each stabilizer is located at least partially below the roller and provides at least one counterforce to at least one force imparted by the roller to the lateral wings, thereby maintaining position of the lateral wings.

In exemplary embodiment(s), the method and/or system includes that each stabilizer includes at least one support that supports the respective lateral wing, the support including a bearing surface that engages against an interface surface of the lateral wing.

In exemplary embodiment(s), the method and/or system includes that the bearing surface has a shape that is complimentary to a shape of the interface surface of the lateral wing.

In exemplary embodiment(s), the method and/or system includes that the interface surface of each lateral wing has a tapered surface, and the bearing surface of each support has a complimentary tapered surface.

In exemplary embodiment(s), the method and/or system includes that each stabilizer includes at least one adjuster configured to modulate the horizontal and/or vertical and/or angular positioning of the support based on a positioning of each lateral wing.

In exemplary embodiment(s), the method and/or system includes that the at least one adjuster includes: one or more manually-adjustable mechanical adjusters; and/or one or more electromechanical adjusters; and/or one or more hydraulic or pneumatic adjusters; and/or one or more elastic adjusters.

In exemplary embodiment(s), the method and/or system includes that each stabilizer includes at least one force generator configured to provide one or more stabilization force(s) that counteract one or more force(s) from the applicator.

12

In exemplary embodiment(s), the method and/or system includes that the one or more force generator(s) generate a force in horizontal and/or vertical and/or angular directions.

In exemplary embodiment(s), the method and/or system includes that the one or more force generator(s) include: one or more biasers; and/or one or more electromagnetic actuators; and/or one or more hydraulic or pneumatic actuators; and/or one or more piezoelectric actuators.

In exemplary embodiment(s), the method and/or system includes that the portion of the respective lateral wing that is elevated is a majority but not an entirety of the respective lateral wing, and only a portion of this elevated portion of the lateral wing is stabilized by the respective stabilizer.

In exemplary embodiment(s), the method and/or system includes that the portion of the respective lateral wing that is elevated is a majority but not an entirety of the respective lateral wing, and an entirety of this elevated portion of the lateral wing is stabilized by the respective stabilizer.

In exemplary embodiment(s), the method and/or system includes that the portion of the respective lateral wing that is elevated is an entirety of the respective lateral wing, and only a portion of this elevated portion of the lateral wing is stabilized by the respective stabilizer.

In exemplary embodiment(s), the method and/or system includes that the portion of the respective lateral wing that is elevated is an entirety of the respective lateral wing, and an entirety of this elevated portion of the lateral wing is stabilized by the respective stabilizer.

In exemplary embodiment(s), the method and/or system includes that buffing the underside surface of the precured tread prior to the applying the polymer cement; wherein the applying the polymer cement includes contacting the polymer cement with the buffed underside surface of the precured tread.

According to another aspect, a method and/or system of retreading a tire, includes: providing a buffed tire casing; applying a cushion gum to the buffed tire casing; providing the precured tread manufactured according to any of the foregoing; applying the precured tread to the tire casing by contacting the polymer cement with the cushion gum; bonding the precured tread to the tire casing by curing the cushion gum using heat and/or pressure.

In exemplary embodiment(s), the method and/or system includes the polymer cement is a rubber mixture that has the same composition as the cushion gum except with the addition of one or more tackifier(s); more particularly wherein the one or more additional tackifier(s) include aliphatic resin(s); and/or more particularly wherein the one or more additional tackifier(s) are added into the rubber mixture of the polymer cement in an amount of up to 25 phr, more particularly from 5 phr to 25 phr.

According to another aspect, a method of preparing a precured tread includes: providing an elongated strip of precured tread having a major portion including a tread surface and at least part of an underside surface opposite the tread surface, and having a lateral wing projecting from each lateral side of the major portion of the precured tread, each lateral wing having a thickness that is less than a thickness of the major portion of the precured tread such that, when the tread surface is supported on and facing a support surface, at least a portion of each lateral wing is elevated with respect to the support surface; buffing the underside surface of the precured tread with a buffer; wherein during the buffing, each lateral wing is stabilized with a respective stabilizer at least at the portion of the lateral wing that is elevated with respect to the support surface.

According to another aspect, a system for preparing a precured tread, includes: a source of precured tread provided as an elongated strip having a major portion including a tread surface and at least part of an underside surface opposite the tread surface, and having a lateral wing projecting from each lateral side of the major portion of the precured tread, each lateral wing having a thickness that is less than a thickness of the major portion of the precured tread such that, when the tread surface is supported on and facing a support surface, at least a portion of each lateral wing is elevated with respect to the support surface; a buffer downstream of the source of precured tread, the buffer being configured to buff the underside surface of the precured tread; and a respective stabilizer mounted on each lateral side of the precured tread below the buffer, the respective stabilizers each having a support with a bearing surface that is configured to engage an interface surface of the respective lateral wings at least at the portion of the respective lateral wing that is elevated with respect to the support surface, thereby stabilizing the respective wings when the buffer buffs the underside surface of the precured tread.

In exemplary embodiment(s), the method and/or system of stabilizing the wings during buffing includes that the buffer includes a buffing wheel, more particularly a wire buffing wheel.

In exemplary embodiment(s), the method and/or system of stabilizing the wings during buffing includes any suitable feature according to the foregoing system and/or method of stabilizing during applying the polymer cement, including for example any suitable feature associated with the stabilizer, such as the features of the support(s), adjuster(s), force generator(s), or the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

Use of "a" or "an" are employed in this disclosure to describe elements and components of the embodiments herein. This is done merely for convenience and to give a general sense of concepts according to the disclosure. This description should be read to include one or at least one and the singular also includes the plural unless otherwise stated.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The phrases "at least one of [A], [B] and [C];" "at least one of [A], [B] or [C];" "one or more of [A], [B] and [C]"; or "one or more of [A], [B] or [C]" are all synonymous with the phrase "and/or" and are used to mean "one, or more, or all" unless clearly indicated to the contrary. Thus, as a non-limiting example, this could mean (1) A only, (2) B only, (3) C only, (4) A and B, (5) A and C, (6) B and C, or (7) all of A, B and C. Other elements may optionally be present other than the elements specifically identified whether related or unrelated to those elements specifically identified unless clearly indicated to the contrary—e.g., by reciting a closed group of alternatives, such as via conventional "Markush grouping" by stating "selected from the group consisting of [A], [B], and [C]."

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides advantage(s) in some embodiment(s), however is not intended to limit the scope of the disclosure to those "particular" or "preferable" features.

The example(s), if any, are for the purpose of illustrating the nature of some of the embodiment(s) and/or aspect(s) of the present disclosure and are not intended as a limitation on the scope thereof. Along these lines, such example(s) may include exemplary ingredients according to certain embodiment(s) of the present disclosure, and also may specifically exclude certain other ingredient(s) according to certain embodiment(s) of the present disclosure. Therefore, it is to be understood that the listing of certain ingredient(s) or class(es) of ingredients in the disclosure which are absent in the example(s) of the disclosure can mean an express exclusion of such ingredient(s) or class(es) of ingredients as if explicitly stated such that the inventor(s) have possession of such exclusion(s). It is understood, of course, that the absence of ingredient(s) according to certain embodiment(s) illustrated in the example(s) is not a limitation on all embodiment(s) of the disclosure, and so some embodiment(s) may include the absent ingredient(s), unless clearly indicated to the contrary.

It is to be understood that all values, ranges, ratios or the like as described in this disclosure may be combined in any manner. In addition, it is to be understood that a concentration or amount or value range listed in this disclosure is intended to include any and every concentration or amount or value within the range, including the end points, as if each value within the range has been expressly stated, and thus these values are incorporated herein by reference. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the inventor(s) appreciate and understand that any and all data points within the range are to be considered to have been specified, and that inventor(s) have possession of the entire range and all points within the range, which are hereby incorporated herein by reference.

In addition, each numerical value used in this disclosure should be read once as modified by the term "about" (unless already expressly so modified), and then read again as not so modified unless otherwise indicated in context. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values. When the term "about" is used in describing a value or an end-point of a range, the disclosure should be understood to include the specific value or end-point referred to.

It is to be understood that terms such as "top," "bottom," "left," "right," "front," "rear," or the like may refer to an arbitrary frame of reference, rather than to the ordinary gravitational frame of reference. Likewise, spatially relative terms, such as "inner", "adjacent", "outer," "beneath," "below," "lower," "above," "upper," or the like, may be used herein for ease of description to describe one element or feature's relationship to another element(s) or feature(s) as illustrated in the figures. Spatially relative terms may be intended to encompass different orientations of the article in use or operation in addition to the orientation depicted in the figures. For example, if the article in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Terms such as first, second, third, etc. may be used herein to describe various elements, components, regions, layers and/or sections, in which it is understood that these elements, components, regions, layers and/or sections should not be limited by these terms unless stated otherwise. In addition, terms such as "first," "second," and other numerical terms when used herein do not imply a sequence or order unless clearly indicated by the context. Thus, a first element, component, region, layer or section discussed herein could be termed a second element, component, region, layer or section without departing from the teachings of this disclosure.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

What is claimed is:
1. A method of preparing a precured tread, comprising:
providing an elongated strip of precured tread having a major portion including a tread surface and at least part of an underside surface opposite the tread surface, and having a lateral wing projecting from each lateral side of the major portion of the precured tread, each lateral wing being configured to form at least a portion of a shoulder of a tire and having a thickness that is less than a thickness of the major portion of the precured tread such that, when the tread surface is supported on and facing a support surface, at least a portion of each lateral wing is elevated with respect to the support surface, wherein the thickness of each lateral wing is from 1.0 mm to 3.5 mm, as measured vertically at its projection from each lateral side of the major portion;
applying a polymer cement to the underside surface of the precured tread with an applicator;
wherein during the applying of the polymer cement, each lateral wing is stabilized with a respective stabilizer at least at the portion of the lateral wing that is elevated with respect to the support surface, wherein each stabilizer includes a bearing surface that engages against an interface surface of the lateral wing that faces toward the support surface and is elevated with respect to the support surface, such that the respective stabilizers stabilize each lateral wing by vertically supporting each lateral wing above the support surface;
wherein each stabilizer includes at least one adjuster configured to modulate the horizontal and/or vertical and/or angular positioning of the support based on a positioning of each lateral wing;

wherein the at least one adjuster includes: one or more manually-adjustable mechanical adjusters; and/or one or more electromechanical adjusters; and/or one or more hydraulic or pneumatic adjusters; and/or one or more elastic adjusters.

2. The method according to claim 1, wherein:

the precured tread is conveyed to the applicator with a conveyor, in which the tread surface is supported on and faces the conveyor so that at least the portion of each lateral wing is elevated with respect to the conveyor;

the applicator includes a roller; and wherein each stabilizer is mounted fixedly relative to the conveyor at a location at least partially below the roller and provides at least one counterforce to at least one force imparted by the roller to the lateral wings, thereby maintaining position of the lateral wings.

3. The method according to claim 1, wherein the bearing surface has a shape that is complimentary to a shape of the interface surface of the lateral wing.

4. The method according to claim 3, wherein:

the interface surface of each lateral wing has a tapered surface, and the bearing surface of each support has a complimentary tapered surface.

5. The method according to claim 1, wherein the at least one adjuster is selected from:

the one or more electromechanical adjusters; and/or the one or more hydraulic or pneumatic adjusters.

6. The method according to claim 5, wherein:

each stabilizer includes at least one force generator configured to provide one or more stabilization force(s) that counteract one or more force(s) from the applicator.

7. The method according to claim 6, wherein:

the one or more force generator(s) generate a force in horizontal and/or vertical and/or angular directions.

8. The method according to claim 6, wherein the one or more force generator(s) include:

one or more biasers; and/or one or more electromagnetic actuators; and/or one or more hydraulic or pneumatic actuators; and/or one or more piezoelectric actuators.

9. The method according to claim 1, further comprising:

buffing the underside surface of the precured tread prior to the applying the polymer cement;

wherein the applying the polymer cement includes contacting the polymer cement with the buffed underside surface of the precured tread.

10. The method of claim 1, wherein each stabilizer does not engage the respective lateral wing on its underside surface that points away from the support surface so that the full underside of each lateral wing is cemented during the applying of the polymer cement.

11. A method of preparing a precured tread, comprising:

providing an elongated strip of precured tread having a major portion including a tread surface and at least part of an underside surface opposite the tread surface, and having a lateral wing projecting from each lateral side of the major portion of the precured tread, each lateral wing being configured to form at least a portion of a shoulder of a tire and having a thickness that is less than a thickness of the major portion of the precured tread such that, when the tread surface is supported on and facing a support surface, at least a portion of each lateral wing is elevated with respect to the support surface, wherein the thickness of each lateral wing is from 1.0 mm to 3.5 mm, as measured vertically at its projection from each lateral side of the major portion;

applying a polymer cement to the underside surface of the precured tread with an applicator;

wherein during the applying of the polymer cement, each lateral wing is stabilized with a respective stabilizer at least at the portion of the lateral wing that is elevated with respect to the support surface, wherein each stabilizer includes a bearing surface that engages against an interface surface of the lateral wing that faces toward the support surface and is elevated with respect to the support surface, such that the respective stabilizers stabilize each lateral wing by vertically supporting each lateral wing above the support surface;

wherein each stabilizer includes at least one force generator configured to provide one or more stabilization force(s) that counteract one or more force(s) from the applicator.

12. The method according to claim 11, wherein the one or more force generator(s) include: one or more biasers; and/or one or more electromagnetic actuators; and/or one or more hydraulic or pneumatic actuators; and/or one or more piezoelectric actuators.

* * * * *